(12) United States Patent
Krishne Gowda et al.

(10) Patent No.: US 12,445,923 B2
(45) Date of Patent: Oct. 14, 2025

(54) MANAGING MULTIPLE SUBSCRIBER IDENTITIES IN CELLULAR NETWORK

(71) Applicant: Nokia Technologies Oy, Espoo (FI)

(72) Inventors: Kishore Krishne Gowda, Bangalore (IN); Nandagopal Peethambaran Nair Rajalakshmi, Karnataka (IN); Sharath Raveendran, Bangalore (IN); Jitendra Kumar Saini, Karnataka (IN); Sambhram Kanavalli, Bangalore (IN); Nanda Kumar, Bangalore (IN); Frank Frederiksen, Klarup (DK); Faranaz Sabouri-Sichani, Aalborg (DK)

(73) Assignee: NOKIA TECHNOLOGIES OY, Espoo (FI)

(*) Notice: Subject to any disclaimer, the term of this patent is extended or adjusted under 35 U.S.C. 154(b) by 359 days.

(21) Appl. No.: 18/004,568

(22) PCT Filed: Jun. 17, 2021

(86) PCT No.: PCT/FI2021/050461
§ 371 (c)(1),
(2) Date: Jan. 6, 2023

(87) PCT Pub. No.: WO2022/013480
PCT Pub. Date: Jan. 20, 2022

(65) Prior Publication Data
US 2024/0244496 A1    Jul. 18, 2024

(30) Foreign Application Priority Data
Jul. 13, 2020  (FI) .................................. 20205753

(51) Int. Cl.
*H04W 36/08* (2009.01)
*H04W 8/20* (2009.01)
(Continued)

(52) U.S. Cl.
CPC ............. *H04W 36/08* (2013.01); *H04W 8/20* (2013.01); *H04W 36/0055* (2013.01); *H04W 36/1446* (2023.05)

(58) Field of Classification Search
CPC ............. H04W 36/08; H04W 36/1446; H04W 36/0055; H04W 8/20
(Continued)

(56) References Cited

U.S. PATENT DOCUMENTS

| 8,121,601 B2 | 2/2012 | Huang et al. |
| 8,718,688 B2 | 5/2014 | Shaheen et al. |

(Continued)

FOREIGN PATENT DOCUMENTS

| WO | 2015/180126 A1 | 12/2015 |
| WO | 2015/180779 A1 | 12/2015 |

(Continued)

OTHER PUBLICATIONS

Extended European Search Report received for corresponding European Patent Application No. 21842242.6, dated Jul. 15, 2024, 10 pages.

(Continued)

*Primary Examiner* — Joel Ajayi
(74) *Attorney, Agent, or Firm* — Lippes Mathias LLP

(57) ABSTRACT

This document discloses a solution for managing multiple subscriber identifiers in a network node. According to an aspect, a method for a first network node comprises: storing at least two subscriber identifiers; triggering a handover procedure for a first subscriber identifier of the at least two subscriber identifiers; and transmitting, during the handover procedure, a handover message to a second network node, the second network node managing a target cell for the
(Continued)

handover procedure, wherein the handover message comprises at least a second subscriber identifier of the at least two subscriber identifiers.

11 Claims, 5 Drawing Sheets

(51) Int. Cl.
*H04W 36/00* (2009.01)
*H04W 36/14* (2009.01)

(58) Field of Classification Search
USPC .......................................................... 455/436
See application file for complete search history.

(56) References Cited

U.S. PATENT DOCUMENTS

| | | |
|---|---|---|
| 8,818,356 B2 | 8/2014 | Young et al. |
| 11,395,130 B2 | 7/2022 | Sabouri-Sichani et al. |
| 2012/0021744 A1 | 1/2012 | Chin et al. |
| 2013/0303203 A1 | 11/2013 | Wang et al. |
| 2015/0065106 A1 | 3/2015 | Catovic et al. |
| 2019/0037531 A1 | 1/2019 | Pantus et al. |

FOREIGN PATENT DOCUMENTS

| | | |
|---|---|---|
| WO | 2016/118248 A1 | 7/2016 |
| WO | 2018/141148 A1 | 8/2018 |

OTHER PUBLICATIONS

"On the paging area management for light connection", 3GPP TSG-RAN WG2 Meeting #95, R2-165258, Agenda: 8.9.1, ASUSTek, Aug. 22-26, 2016, 3 pages.

"3rd Generation Partnership Project; Technical Specification Group Radio Access Network; NG-RAN; Xn application protocol (XnAP) (Release 16)", 3GPP TS 38.423, V16.0.0, Dec. 2019, pp. 1-330.

"Revised SID: Study on system enablers for multi-SIM devices", TSG SA Meeting #SP-83, SP-190248, Agenda: 17B.19, SA WG2, Mar. 20-22, 2019, 4 pages.

"New Rel-17 SID proposal: Study on multi-SIM devices in RAN", 3GPP TSG RAN Meeting #83, RP-190282, Agenda: 9.1.2, vivo, Mar. 18-21, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; System architecture for the 5G System (5GS); Stage 2 (Release 16)", 3GPP TS 23.501, V16.3.0, Dec. 2019, pp. 1-417.

"3rd Generation Partnership Project; Technical Specification Group Radio Access Network; NR; NR and NG-RAN Overall Description; Stage 2 (Release 16)", 3GPP TS 38.300, V16.0.0, Dec. 2019, pp. 1-101.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.8.0, Dec. 2019, pp. 1-964.

"3rd Generation Partnership Project; Technical Specification Group Radio Access Network; Evolved Universal Terrestrial Radio Access (E-UTRA); User Equipment (UE) procedures in idle mode (Release 15)", 3GPP TS 36.304, V15.5.0, Dec. 2019, pp. 1-55.

"3rd Generation Partnership Project; Technical Specification Group Services and System Aspects; Service requirements for Machine-Type Communications (MTC); Stage 1 (Release 15)", 3GPP TS 22.368, V15.0.0, Jul. 2019, pp. 1-26.

Office action received for corresponding Finnish Patent Application No. 20205753, dated Mar. 9, 2021, 7 pages.

International Search Report and Written Opinion received for corresponding Patent Cooperation Treaty Application No. PCT/FI2021/050461, dated Sep. 29, 2021, 16 pages.

"3rd Generation Partnership Project; Technical Specification Group Services and System Aspects; Study on system enablers for devices having multiple Universal Subscriber Identity Modules (USIM) (Release 17)", 3GPP TR 23.761, V0.4.0, Jun. 2020, pp. 1-78.

MANAGING MULTIPLE SUBSCRIBER IDENTITIES IN CELLULAR NETWORK

RELATED APPLICATION

This application was originally filed as PCT Application No. PCT/FI2021/050461, filed on Jun. 17, 2021, which claims priority from Finnish Application No. 20205753, filed on Jul. 13, 2020, each of which is incorporated herein by reference in its entirety.

FIELD

Various embodiments described herein relate to the field of cellular communications and, particularly, to radio access network operations related to terminal devices having multiple subscriber identities.

BACKGROUND

Terminal devices or user equipment (UE) of cellular communication systems have been capable of supporting multiple subscriber identities for a long time. A subscriber identity is typically realized by a subscriber identifier such as International Mobile Subscriber Identity (IMSI) or a unique subscription permanent identifier (SUPI). The subscriber identifier may be stored in a universal subscriber identity module (USIM) or a similar module. This module may comprise of hardware and/or software components. A terminal device may operate multiple subscriber identities in parallel and independently, depending on the hardware and/ or software configuration of the terminal device. Some (even a plurality) of the subscriber identities may have an active radio resource connection in operation while some of the subscriber identities may be in an idle state.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for a first network node, comprising means for performing: storing at least two subscriber identifiers; triggering a handover procedure for a first subscriber identifier of the at least two subscriber identifiers; and transmitting, during the handover procedure, a handover message to a second network node, the second network node managing a target cell for the handover procedure, wherein the handover message comprises at least a second subscriber identifier of the at least two subscriber identifiers.

In an embodiment, the second subscriber identifier has no handover or cell reselection procedure pending during transmission of the handover message.

In an embodiment, the second subscriber identifier is associated with a radio resource control connection that is in an idle state or inactive state during the handover procedure.

In an embodiment, the handover procedure is a procedure for transferring a context of the first subscriber identifier in response to a connection of the first subscriber identifier transitioning from an idle state or an inactive state to a connected state.

In an embodiment, the means are configured to transmit the at least second subscriber identifier to the second network node in an unsolicited manner.

In an embodiment, the means are configured to: transmit, to the second network node, a request for indicating whether or not the second network node accepts information on multiple subscriber identifiers; receive, from the second network node as a response to the request, a message indicating whether or not the second network node accepts the information on multiple subscriber identifiers; and wherein the handover message comprising at least the second subscriber identifier is responsive to the second network node indicating that the second network node accepts the information on multiple subscriber identifiers. In an embodiment, the request comprises at least one information element indicating whether or not the first network node accepts information on multiple subscriber identifiers.

In an embodiment, the handover message further comprises at least one equipment identifier and information mapping the first identifier and the at least second identifier to the at least one equipment identifier.

In an embodiment, the apparatus is a terminal device.

According to another aspect, there is provided an apparatus for a first network node, comprising means for performing: receiving, from a second network node, a handover message indicating handover of a connection of a first subscriber identifier of a terminal device, the handover being from the second network node to the first network node, wherein the handover message comprises at least a second subscriber identifier; storing the first subscriber identifier and the second identifier; and performing at least one procedure using the second identifier.

In an embodiment, the at least second subscriber identifier is transmitted by the second network node as unsolicited by the apparatus.

In an embodiment, the means are configured to: receive, from the second network node, a request for indicating whether or not the first network node accepts information on multiple subscriber identifiers; transmit, to the second network node as a response to the request, a message indicating whether or not the first network node accepts the information on multiple subscriber identifiers; and wherein the handover message comprising at least the second subscriber identifier is responsive to the first network node indicating that the first network node accepts the information on multiple subscriber identifiers.

In an embodiment, the request comprises at least one information element indicating whether or not the second network node accepts information on multiple subscriber identifiers, and wherein the means are configured to store information indicated by the at least one information element and use the information in connection with a handover procedure where a radio connection is handed from the first network node over to the second network node.

In an embodiment, the at least one procedure using the second subscriber identifier comprises a paging procedure for the second subscriber identifier wherein the means are configured to cause the apparatus to reduce a paging area by using the second subscriber identifier.

In an embodiment, the first network node and the second network node belong to a first network, wherein the second subscriber identifier belongs to a second network, and wherein the at least one procedure using the second subscriber identifier comprises a procedure of transmitting the second subscriber identifier to a network node of the second network.

In an embodiment, the means in any one of the above-described embodiments comprise at least one processor and at least one memory including computer program code, wherein the at least one memory and computer program code are configured, with the at least one processor, to cause the performance of the apparatus.

According to an aspect, there is provided a method for a first network node, comprising: storing at least two subscriber identifiers; triggering a handover procedure for a first subscriber identifier of the at least two subscriber identifiers; and transmitting, during the handover procedure, a handover message to a second network node, the second network node managing a target cell for the handover procedure, wherein the handover message comprises at least a second subscriber identifier of the at least two subscriber identifiers.

In an embodiment, the second subscriber identifier has no handover or cell reselection procedure pending during transmission of the handover message.

In an embodiment, the second subscriber identifier is associated with a radio resource control connection that is in an idle state or inactive state during the handover procedure.

In an embodiment, the handover procedure is a procedure for transferring a context of the first subscriber identifier in response to a connection of the first subscriber identifier transitioning from an idle state or an inactive state to a connected state.

In an embodiment, the first network node transmits the at least second subscriber identifier to the second network node in an unsolicited manner.

In an embodiment, the first network node further performs the following: transmitting, to the second network node, a request for indicating whether or not the second network node accepts information on multiple subscriber identifiers; receiving, from the second network node as a response to the request, a message indicating whether or not the second network node accepts the information on multiple subscriber identifiers; and wherein the handover message comprising at least the second subscriber identifier is responsive to the second network node indicating that the second network node accepts the information on multiple subscriber identifiers. In an embodiment, the request comprises at least one information element indicating whether or not the first network node accepts information on multiple subscriber identifiers.

In an embodiment, the handover message further comprises at least one equipment identifier and information mapping the first identifier and the at least second identifier to the at least one equipment identifier.

In an embodiment, the method is performed by a terminal device. In another embodiment, the method is performed by an access node.

According to an aspect, there is provided a computer program product embodied on a computer-readable medium and comprising a computer program code readable by a computer, wherein the computer program code configures the computer to carry out a computer process comprising in a first network node: storing at least two subscriber identifiers; triggering a handover procedure for a first subscriber identifier of the at least two subscriber identifiers; and transmitting, during the handover procedure, a handover message to a second network node, the second network node managing a target cell for the handover procedure, wherein the handover message comprises at least a second subscriber identifier of the at least two subscriber identifiers.

In an embodiment, the computer program product further comprises a computer program code that configures the computer to carry out any one of the above-described embodiments of the method for the first network node.

According to another aspect, there is provided a method for a first network node, comprising: receiving, from a second network node, a handover message indicating handover of a connection of a first subscriber identifier of a terminal device, the handover being from the second network node to the first network node, wherein the handover message comprises at least a second subscriber identifier; storing the first subscriber identifier and the second identifier; and performing at least one procedure using the second identifier.

In an embodiment, the at least second subscriber identifier is transmitted by the second network node as unsolicited by the first network node.

In an embodiment, the first network node further performs the following: receiving, from the second network node, a request for indicating whether or not the first network node accepts information on multiple subscriber identifiers; transmitting, to the second network node as a response to the request, a message indicating whether or not the first network node accepts the information on multiple subscriber identifiers; and wherein the handover message comprising at least the second subscriber identifier is responsive to the first network node indicating that the first network node accepts the information on multiple subscriber identifiers.

In an embodiment, the request comprises at least one information element indicating whether or not the second network node accepts information on multiple subscriber identifiers, and wherein the first network node stores information indicated by the at least one information element and uses the information in connection with a handover procedure where a radio connection is handed from the first network node over to the second network node.

In an embodiment, the at least one procedure using the second subscriber identifier comprises a paging procedure for the second subscriber identifier wherein the first network node reduces a paging area by using the second subscriber identifier.

In an embodiment, the first network node and the second network node belong to a first network, wherein the second subscriber identifier belongs to a second network, and wherein the at least one procedure using the second subscriber identifier comprises a procedure of transmitting the second subscriber identifier to a network node of the second network.

According to an aspect, there is provided a computer program product embodied on a computer-readable medium and comprising a computer program code readable by a computer, wherein the computer program code configures the computer to carry out a computer process comprising in a first network node: storing at least two subscriber identifiers; triggering a handover procedure for a first subscriber identifier of the at least two subscriber identifiers; and transmitting, during the handover procedure, a handover message to a second network node, the second network node managing a target cell for the handover procedure, wherein the handover message comprises at least a second subscriber identifier of the at least two subscriber identifiers.

According to another aspect, there is provided a computer program product embodied on a computer-readable medium and comprising a computer program code readable by a computer, wherein the computer program code configures the computer to carry out a computer process comprising in a first network node: receiving, from a second network node, a handover message indicating handover of a connection of a first subscriber identifier of a terminal device, the handover being from the second network node to the first network node, wherein the handover message comprises at least a second subscriber identifier; storing the first subscriber identifier and the second identifier; and performing at least one procedure using the second identifier.

In an embodiment, the computer program product further comprises a computer program code that configures the computer to carry out any one of the above-described embodiments of the method for the first network node that receives the handover message.

LIST OF DRAWINGS

Embodiments are described below, by way of example only, with reference to the accompanying drawings, in which FIG. 1 illustrates a wireless communication scenario to which some embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution (LTE), long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, substantially the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
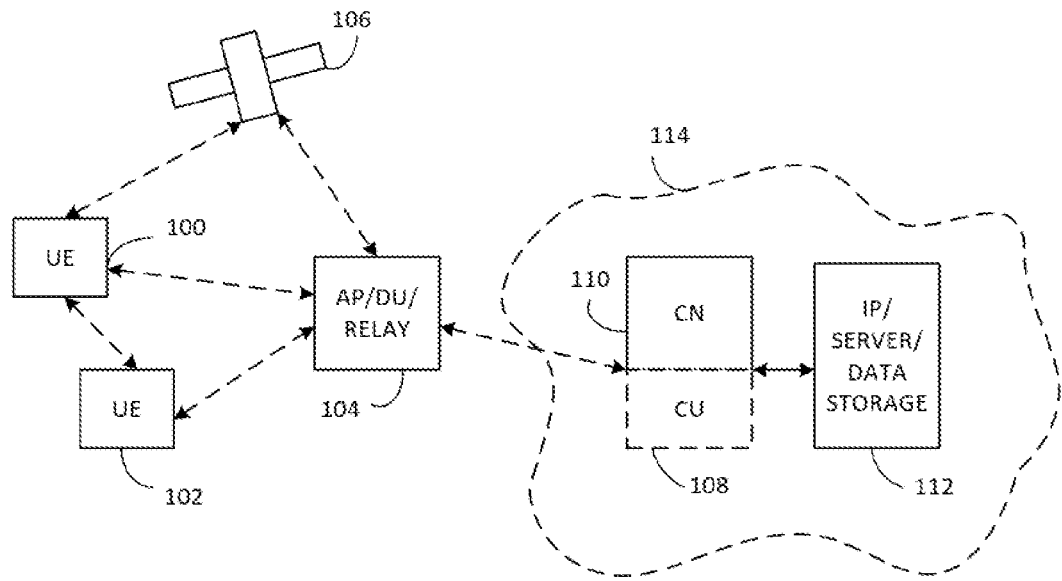

FIG. 1 depicts examples of simplified system architectures showing some elements and functional entities, some or all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in $3^{rd}$ Generation Partnership Project (3GPP) specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB, in which case the (e/g)NodeBs may also be configured to communicate with one another over links, wired or wireless, designed for the purpose. These links may be used for signaling purposes and/or for routing data from one (e/g)NodeB to another. The (e/g)NodeB is a computing device configured to control the radio resources of communication system it is coupled to. The (e/g)NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), 5GC elements like UPF, AMF, SMF etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, above 6 GHz-cmWave-mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As described in Background, a terminal device may have multiple subscriber identities and corresponding subscriber identifiers. The terminal device may use cellular communication services via one or more subscriptions. A subscription may be bound to a universal subscriber identity module (USIM) and be identified by a unique subscription permanent identifier (SUPI) or international mobile subscriber identity (IMSI), depending on the cellular communication system. SUPI comprises a mobile country code (MCC), a mobile network code (MNC), and a mobile subscription identification number (MSIN). The terminal device may additionally have one or more equipment identifiers, depending on hardware of the terminal device. Examples of the equipment identifier are international mobile equipment identifier (IMEI) and a permanent equipment identifier (PEI). In an example, the terminal device may operate one connection with a cellular communication system via one subscriber identifier and one equipment identifier and, additionally, operate another connection with substantially the same or different cellular communication system via another subscriber identifier and another equipment identifier. A subscriber identifier may be linked to an equipment identifier in a network node of a cellular communication system during a connection.

The connection(s) may comprise a radio resource control (RRC) connection specified in 3GPP specifications, for example. The connection may be generally understood as a part of a cellular communication service established for the terminal device to gain access to the cellular communication system and to other communication networks. A terminal device with multiple subscriber identities (a MUSIM terminal device) may be registered to the cellular communication system and operate in any one of the RRC states (RRC_idle, RRC_inactive, or RRC_connected) with one or more subscription identities. When a network node of the cellular communication system is not aware that these multiple subscription identities are co-located in substantially the same terminal device, the network node may be unable to optimize certain procedures and, instead, may treat the subscription identifiers of the user terminal independently.

Figure 2:
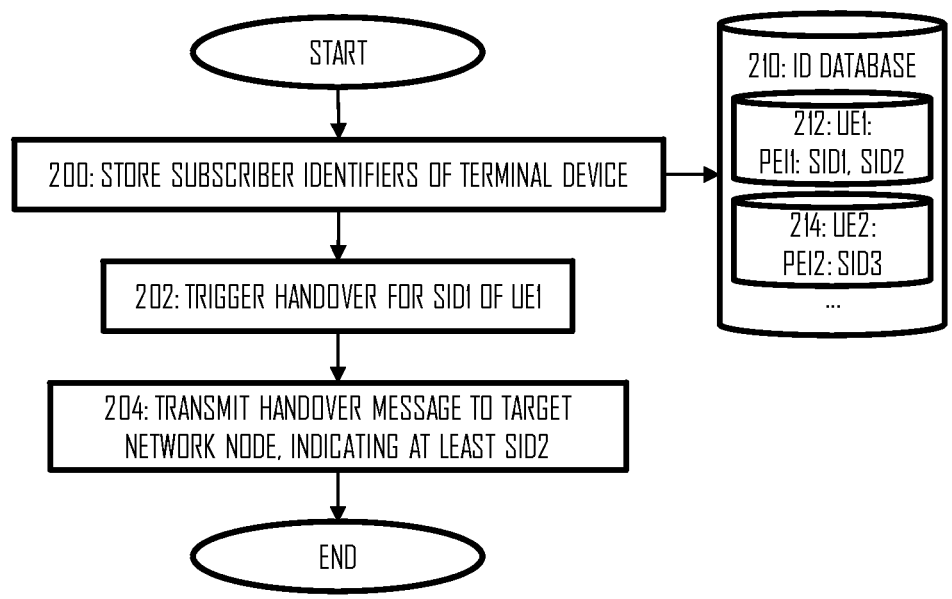
FIGS. 2 and 3 illustrate some embodiments for sharing multiple subscriber identifiers of a terminal device between network nodes.
Figure 3:
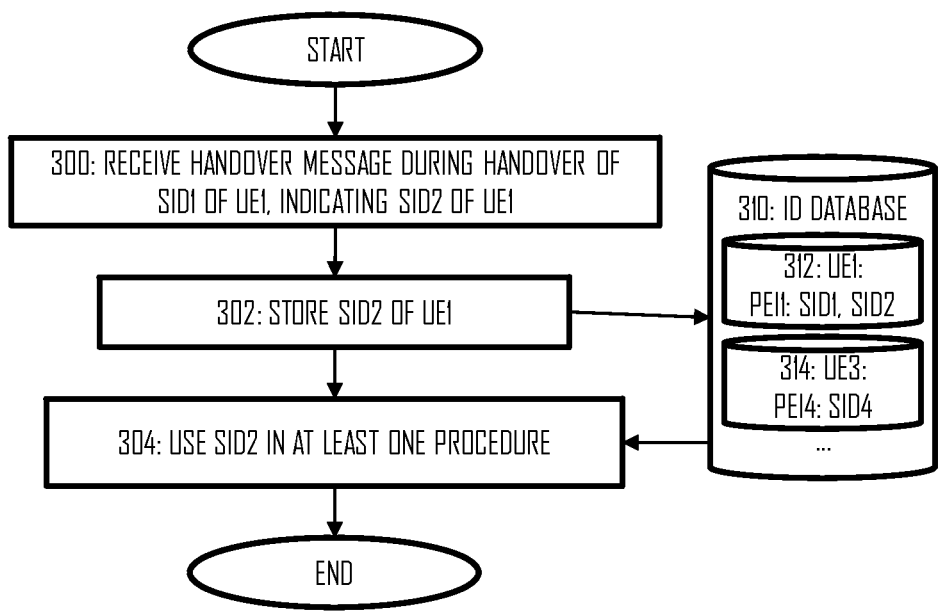

FIGS. 2 and 3 illustrate some embodiments for sharing the information on the multiple subscriber identifiers of a terminal device between network nodes of the cellular communication system. In the embodiments, the information is shared during a handover procedure of the terminal device. FIG. 2 illustrates a process for a source network node of the handover, while FIG. 3 illustrates a process for a target network node of the handover. The network nodes may be access nodes of the cellular communication system but, in case the handover is performed between network nodes other than the access nodes, the network nodes may be other network nodes of the cellular communication system.

Referring to FIG. 2, the process in the source network node comprises: storing (block 200) at least two subscriber identifiers of the terminal device; triggering (block 202) a handover procedure for a first subscriber identifier of the terminal device; and transmitting (block 204), during the handover procedure, a handover message to the target network node managing a target cell for the handover procedure, wherein the handover message comprises at least a second subscriber identifier of the terminal device.

In an embodiment, the multiple subscriber identifiers are stored in a subscriber identifier database 210 stored in a memory of the source network node or in a repository accessible to the source network node. The database 210 may store a record 212 for the terminal device (UE1) and a similar record 214 for other terminal devices served by the source network node. The record 212 may store, in connection with the terminal device, one or more equipment identifiers (e.g. PEI1) of the terminal device and the multiple subscriber identifiers (e.g. SID1, SID2) of the terminal device. In case the terminal device has multiple equipment identifiers, the record 212 may also store mappings between the subscriber identifiers and the equipment identifiers. For example, the record may store, per at least one equipment identifier, one or more subscriber identifiers linked to the equipment identifier. The network node may share the equipment identifier(s) of the terminal device together with the subscriber identifier(s) in the handover message in block 204 and, in some embodiments, also the mapping between the subscriber identifier(s) and the equipment identifier(s). The mapping may indicate, for one or more or all shared subscriber identifiers an equipment identifier currently used by the respective subscriber identifier for a RRC connection. In an embodiment, the database 210 also stores an identifier of a network node currently serving at least some of the subscriber identifiers. For example, the source network node may serve the first subscriber identifier while another network node may serve the second subscriber identifier, and the database may store the identifier(s) of the network node(s) serving the subscriber identifier(s) other than the first subscriber identifier. This information may also be shared to the target network node in block 204.

Referring to FIG. 3, the process in the target network node comprises: receiving (block 300), from the source network node, the handover message indicating handover of the connection of a first subscriber identifier of the terminal device to target network node, wherein the handover message comprises at least the second subscriber identifier of the terminal device; storing (block 302) the first subscriber identifier and the second identifier as linked to the terminal device; and performing (block 304) at least one procedure using the second identifier.

The target network node may maintain a similar identifier database 310 as the source network node. As a result of the procedure of FIGS. 2 and 3, the record 312 of the terminal device in the database 310 is updated to have a higher correlation with the record 212 in the database 210. The record 312 may be updated with substantially the same information as in the record 212 by delivering the one or more subscriber identifiers of the terminal device to the target network node. The databases 210, 310 may still store different records because the network nodes serve different terminal devices.

In an embodiment, upon completing the handover or upon delivering the other subscriber identifiers that are not subject to the handover to the target network node, the source network node may delete the record 212 of the terminal device. The source network node may, however, maintain the record 212 for a certain period of time in preparation for a potential handover back to the source network node, or until the target network node indicates release of a context of the terminal device to the source network node.

As described above, the second subscriber identifier is transferred from the source network node to the target network node during a handover of a connection of the first subscriber identifier. In an embodiment, the second subscriber identifier has no handover procedure pending during transmission of the handover message or during the handover procedure.

The above-described embodiments enable the network nodes to share the information on multi-SIM (MUSIM) capability of the terminal device. As a result, the procedures using the MUSIM capability information may gain benefits immediately upon handing the terminal device over to the target network node. This cooperation provides an improvement to a solution where the network nodes would have to independently detect the MUSIM capability, and the improvement may be gained in terms of reduced signaling in radio interface, and improved performance in the procedures using the MUSIM capability information.

In an embodiment, the second subscriber identifier is associated with a RRC connection that is in an idle state (RRC_idle).

In an embodiment, the second subscriber identifier is associated with a RRC connection that is in an inactive state (RRC_inactive).

In an embodiment, the second subscriber identifier is associated with a RRC connection that is in a connected state (RRC_connected).

In some embodiments, the second subscriber identifier is linked to the substantially same equipment identifier as the first subscriber identifier. In other embodiments, the second subscriber identifier is linked to a different equipment identifier than the first subscriber identifier.

In an embodiment, the handover message further comprises at least one equipment identifier of the terminal device. The handover message may also include information that maps at least one subscriber identifier of the terminal device to at least one equipment identifier.

In an embodiment, at least one further subscriber identifier of the terminal device is transmitted in block 204 and received in block 300. In an embodiment, some or all the subscriber identifiers of the terminal device that are known to the source network node are transferred to the target network node during the handover procedure.

In an embodiment, the first subscriber identifier and the second subscriber identifier are subscriber identifiers of substantially the same public land mobile network (PLMN). In another embodiment, the first subscriber identifier and the second subscriber identifier are subscriber identifiers of different public land mobile networks. Depending on the PLMN of the second subscriber identifier, the procedure executed in block 304 may be different. Some embodiments are described below in connection with FIGS. 6 and 7.

In an embodiment, the handover message is transmitted and received over an X2 interface or an Xn interface, depending on the configuration of the cellular communication system. LTE systems may employ the X2 interface while 5G networks may employ the Xn interface between the access nodes. In embodiments where the network nodes are other than access nodes, another interface may be employed. An example of such another interface is an S10 interface between mobility management entities of an LTE network.

In an embodiment, the network node transmitting the second subscriber identifier in the handover message is the terminal device. For example, upon receiving an instruction to hand the RRC connection over to the target network node, the terminal device may, when executing the handover, transmit to the target network node a message comprising the second subscriber identifier and, optionally, further subscriber identifier(s) of the terminal device. In another embodiment where the network node transmitting the second subscriber identifier is a terminal device is where the terminal device provides another terminal device access to a radio access network of a cellular communication system via a device-to-device (D2D) link, and the D2D link is handed over to an access node of the radio access network. In such a solution, the terminal device may operate as the network node that is the source of the handover.

Figure 4:
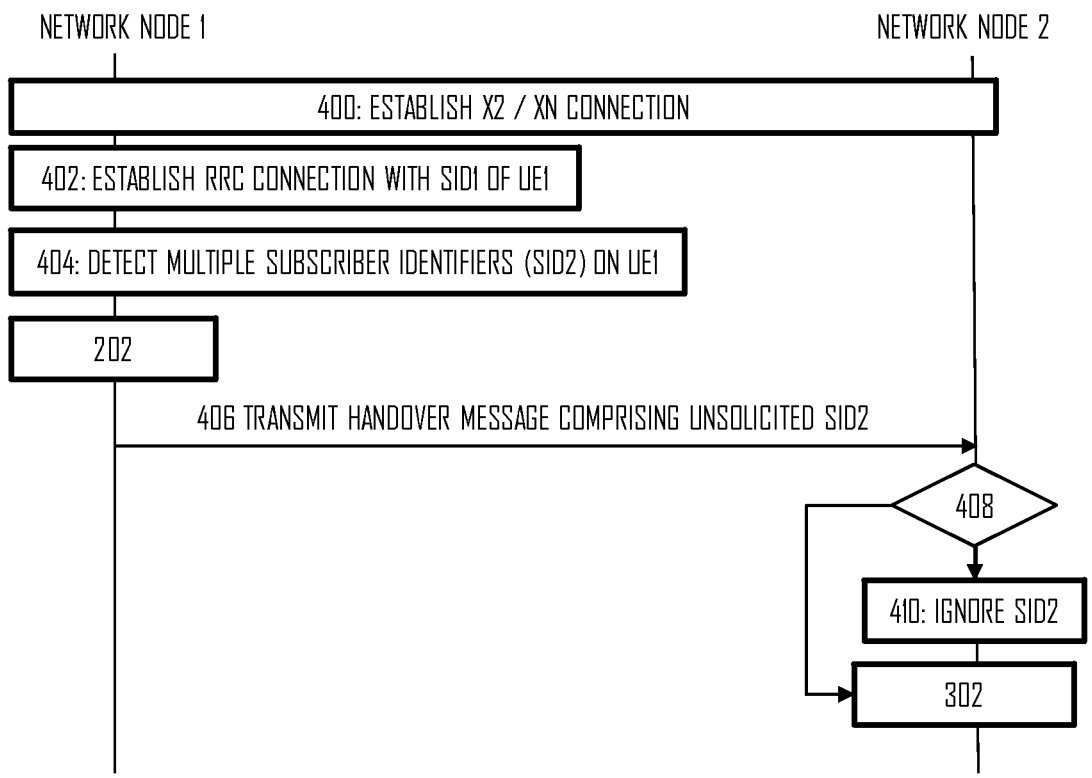
FIGS. 4 and 5 illustrate signalling diagrams that combine the processes of FIGS. 2 and 3 according to some embodiments.

In an embodiment, the source network node transmits at least the second subscriber identifier to the second network node in an unsolicited manner. FIG. 4 illustrates an embodiment of such a procedure. Referring to FIG. 4, the source network node is denoted by network node 1 while the target network node is denoted by network node 2. In block 400, the network nodes may establish the interface between them, e.g. the X2 or Xn interface. The interface may be established in connection with setting up the cellular communication system or upon adding a new network node to the cellular communication system. In this embodiment, block 400 may be executed in a conventional manner. In block 402, the network node 1 establishes an RRC connection with the first subscriber identifier of the terminal device (UE1). The RRC connection may be established according to 3GPP specifications. In block 404, the network node 1 detects that the terminal device has multiple subscriber identifiers and performs block 200 (update the database 210). The detection may be based on the terminal device transmitting to the network node one or more messages that comprise the multiple subscriber identifiers. For example, the terminal device may indicate the multiple subscriber identifiers when establishing the RRC connection. In such a case, block 404 may be comprised in block 402. In some embodiments, block 404 is based on the terminal device registering to the cellular communication system with at least one other subscriber identifier than the first subscriber identifier. In embodiments where the at least one other subscriber identifier comprises a subscriber identifier of another PLMN, the network node may receive such a subscriber identifier from the terminal device or from a network node of the other PLMN. The operators of the PLMNs may have agreed to share information on the terminal devices, and such shared information may include information on the MUSIM capability of the terminal devices. Other solutions for gaining knowledge of the MUSIM capability of the terminal device may be possible.

Thereafter, block 202 may be executed as a response to mobility of the terminal device or a change in conditions of the RRC connection between the network node 1 and the terminal device. As a response to triggering the handover, the network node 1 transmits (step 406) to the network node 2 one or more handover messages, wherein at least one of the handover messages comprises at least one subscriber identifier of the terminal device other than the first subscriber identifier. Since the RRC connection of the first subscriber identifier is handed over, the first subscriber identifier may also be transmitted in the one or more handover messages but in a different information element than the information element(s) carrying the other subscriber identifier(s) of the terminal device.

In an embodiment, the handover procedure is due to mobility of the terminal device when RRC connection of the first subscriber identifier is in a connected state. In such an embodiment, one or more handover messages may comprise a handover request carrying the subscriber identifiers. Below, an example of information elements of such a handover request are provided in standard language.

fier(s), the network node 2 may determine in block 408 whether or not to employ the information. Upon determining to not employ the information, the network node may ignore the subscriber identifiers (SID2) and other related MUSIM capability information of the terminal device (block 410). However, upon determining to employ the MUSIM capability information, the network node 2 may execute block 302 and store the information in the database 310.

Figure 5:
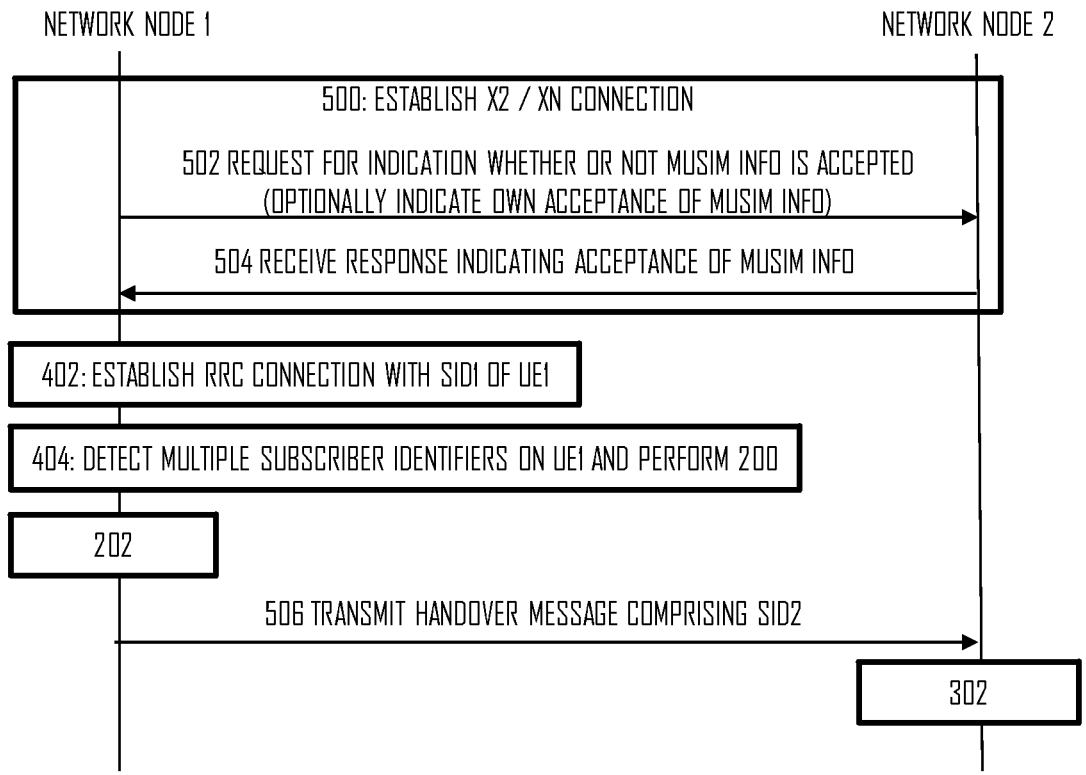

In the embodiment of FIG. 4, the network node 1 transmits the other subscriber identifier(s) to the network node 2 as unsolicited, and the network node 2 may then determine whether or not to employ the information. FIG. 5 illustrates an embodiment where the transmission of the other subscriber identifier(s) of the terminal device is solicited by the network node 2. In such an embodiment, the network node 1 may transmit, to the network node 2, a request for indicating whether or not the network node 2 accepts information on multiple subscriber identifiers; receive, from the network node 2 as a response to the request, a message indicating whether or not the network node 2 accepts the information on multiple subscriber identifiers. In a similar

```
HandoverRequest-IEs XNAP-PROTOCOL-IES ::= {
{ID id-sourceNG-          CRITICALITY reject    TYPE NG-            PRESENCE
RANnodeUEXnAPID                                 RANnodeUEX          mandatory}|
                                                nAPID
{ID id-Cause              CRITICALITY reject    TYPE Cause          PRESENCE
                                                                    mandatory}|
{ID id-                   CRITICALITY reject    TYPE Target-        PRESENCE
targetCellGlobalID                              CGI                 mandatory}|
{ID id-GUAMI              CRITICALITY reject    TYPE GUAMI          PRESENCE
                                                                    mandatory}|
{ID id-                   CRITICALITY reject    TYPE                PRESENCE
UEContextInfoHOReque                            UEContextInf        mandatory}|
st                                              oHORequest
{ID id-TraceActivation    CRITICALITY ignore    TYPE                PRESENCE
                                                TraceActivati       optional }|
                                                on
{ID id-MaskedIMEISV       CRITICALITY ignore    TYPE                PRESENCE
                                                MaskedIMEIS         optional }|
                                                V
{ID id-                   CRITICALITY ignore    TYPE                PRESENCE
UEHistoryInformation                            UEHistoryInfo       mandatory}|
                                                rmation
{ID id-                   CRITICALITY ignore    TYPE MUSIM-         PRESENCE
MUSIMMaskedIMEISV                               MaskedIMEIS         optional }|
                                                VList
{ID id-                   CRITICALITY ignore    TYPE                PRESENCE
UEContextRefAtSN-                               UEContextRef        optional }
HORequest                                       AtSN-
                                                HORequest
...
}
MUSIM-MaskedIMEISVList ::= SEQUENCE {
  MaskedIMEISV       BIT STRING (SIZE(64))
}
```

In an embodiment, the information element MUSIM-MaskedIMEISVList comprises the other subscriber identifier(s) of the terminal device. The information element may comprise, in addition to the other subscriber identifier(s), one or more identifiers of the PLMN of the other subscriber identifier(s). The information element may also carry other identifiers related to the subscriber identifiers, e.g. the one or more equipment identifiers such as IMEI or PEI. The network node 2 may employ this information in the various procedures when executing block 304.

Upon receiving the handover message in step 406, the network node 2 may acknowledge reception of the handover message to the network node 1. Upon detecting that the handover message includes the MUSIM capability information of the terminal device, e.g. the other subscriber identiembodiment, the network node 2 may receive, from the network node 1, the request for indicating whether or not the network node 2 accepts information on multiple subscriber identifiers; transmit, to the network node 1 as the response to the request, the message indicating whether or not the network node 2 accepts the information on multiple subscriber identifiers. Then, the handover message comprising at least the second subscriber identifier of the terminal device may be responsive to the network node 2 indicating that the network node 2 accepts the information on multiple subscriber identifiers.

Referring to FIG. 5, this procedure may be carried out during the establishment or reconfiguration (block 500) of the X2 or Xn interface or connection between the network nodes (another interface in other embodiments). In step 502, the network node 1 may transmit the request for indicating whether or not the network node 2 accepts the MUSIM capability information. In an embodiment, the request comprises at least one information element indicating whether or not the network node 1 itself accepts the MUSIM capability information on multiple subscriber identifiers. As a consequence, with a single request-response procedure both network nodes may become aware of one another's policy with respect to sharing/accepting the MUSIM capability information. Upon receiving the request in step 502, the network node 2 may prepare a response to the request and add to the response the at least one information element indicating whether or not the network node 2 accepts the MUSIM capability information. If the request comprises the at least one information element indicating whether or not the network node 1 accepts the MUSIM capability information on multiple subscriber identifiers, the network node 2 may store the information and use the information in connection with a handover of a terminal device from the network node 2 to the network node 1 according to the principles described above for the reversed situation. In step 504, the network node 2 transmits the response to the network node 1 and, upon receiving the response, the network node 1 stores the information. Let us assume that the network node 2 accepts the MUSIM capability information, i.e. the network node 2 solicits the transmission of the MUSIM capability information. As a consequence, the rest of the procedure may proceed in manner described above in connection with FIG. 4. The difference is that the handover message transmitted in step 506 is now solicited. The contents of the handover message may be substantially the same as in the embodiments described above in connection with FIG. 4.

Tables below illustrate some embodiments of information elements comprised in the request transmitted in step 502 and in the response transmitted in step 504, when the interface is the Xn interface. In the Tables, the information element MUSIMInfo may carry the information on the acceptance of the MUSIM capability information.

| XnSetupRequest-IEs XNAP-PROTOCOL-IES ::= { | | | |
|---|---|---|---|
| { ID id-GlobalNG-RAN-node-ID | CRITICALITY reject | TYPE GlobalNG-RANNode-ID | PRESENCE mandatory }\| |
| { ID id-TAISupport-list | CRITICALITY reject | TYPE TAISupport-List | PRESENCE mandatory }\| |
| { ID id-AMF-Region-Information | CRITICALITY reject | TYPE AMF-Region-Information | PRESENCE mandatory }\| |
| { ID id-List-of-served-cells-NR | CRITICALITY reject | TYPE ServedCells-NR | PRESENCE optional }\| |
| { ID id-List-of-served-cells-E-UTRA | CRITICALITY reject | TYPE ServedCells-E-UTRA | PRESENCE optional }\| |
| { ID id-InterfaceInstanceIndication | CRITICALITY reject | TYPE InterfaceInstanceIndication | PRESENCE optional }\| |
| { ID id-TNLConfigurationInfo | CRITICALITY ignore | TYPE TNLConfigurationInfo | PRESENCE optional}, |
| { ID id-MUSIMInfo | OCTET STRING | | PRESENCE OPTIONAL }, |
| ... | | | |
| } | | | |

| XnSetupResponse-IEs XNAP-PROTOCOL-IES ::= { | | | |
|---|---|---|---|
| { ID id-GlobalNG-RAN-node-ID | CRITICALITY reject | TYPE GlobalNG-RANNode-ID | PRESENCE mandatory }\| |
| { ID id-TAISupport-list | CRITICALITY reject | TYPE TAISupport-List | PRESENCE mandatory }\| |
| { ID id-List-of-served-cells-NR | CRITICALITY reject | TYPE ServedCells-NR | PRESENCE optional }\| |
| { ID id-List-of-served-cells-E-UTRA | CRITICALITY reject | TYPE ServedCells-E-UTRA | PRESENCE optional }\| |
| {ID id-CriticalityDiagnostics | CRITICALITY ignore | TYPE CriticalityDiagnostics | PRESENCE optional }\| |
| {ID id-AMF-Region-Information | CRITICALITY reject | TYPE AMF-Region-Information | PRESENCE optional}\| |
| {ID id-InterfaceInstanceIndication | CRITICALITY reject | TYPE InterfaceInstanceIndication | PRESENCE optional }\| |
| {ID id-TNLConfigurationInfo | CRITICALITY ignore | TYPE TNLConfigurationInfo | PRESENCE optional}, |
| { ID id-MUSIMInfo | OCTET STRING | | PRESENCE OPTIONAL }, |

Figure 9:
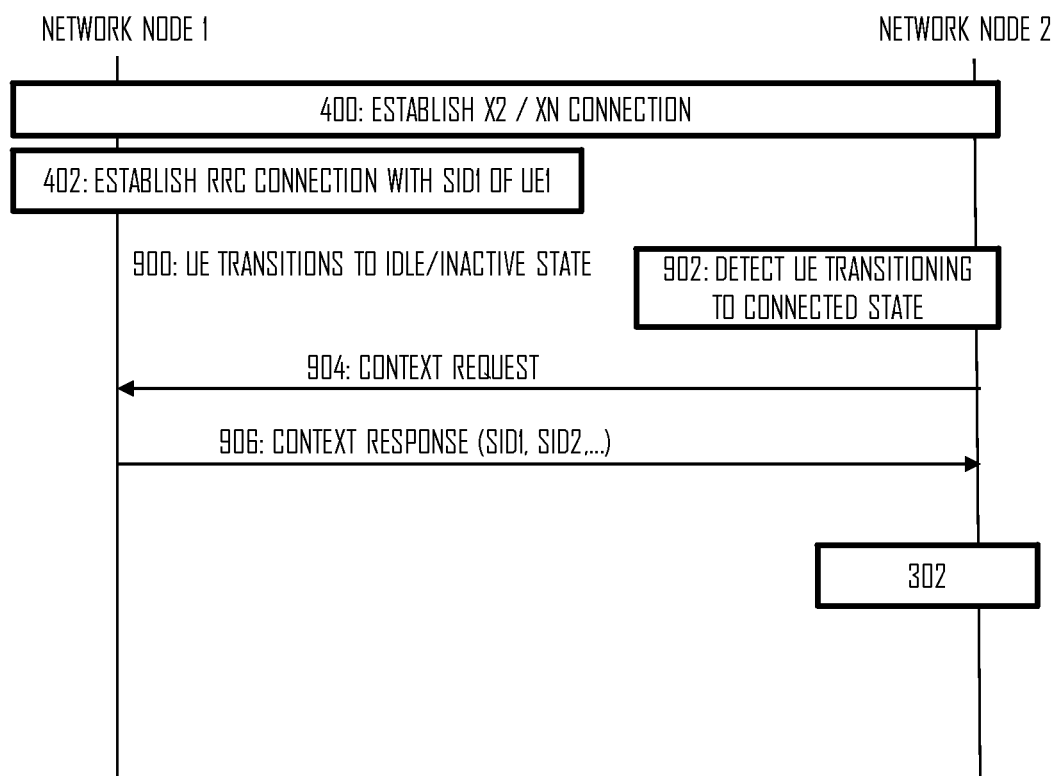
FIG. 9 illustrates a signalling diagram of yet other embodiments of the processes of FIGS. 2 and 3.

In some embodiments, the handover procedure is a procedure for transferring a context of the first subscriber identifier in response to a connection of the first subscriber identifier transitioning from an idle state or an inactive state to a connected state. For example, the connection may have transitioned to the idle state or inactive state while being served by network node 1. Then, the terminal device may move in the idle state or inactive state to a service area of network node 2. The network nodes 1 and 2 need not be neighbouring network nodes. Upon entering the connected state again in the service area of network node 2, the network node 2 may instantiate a context transfer procedure where parameters of the connection are retrieved from network node 1. In such a handover procedure, a handover message indicating the multiple subscriber identifiers of the terminal device may be transferred to the network node 2. FIG. 9 illustrates such a procedure. The same reference numbers as in FIG. 4 represent the same or substantially similar steps as described above. Referring to FIG. 9, upon establishing the RRC connection and discovering the multi-SIM information of the terminal device, the RRC connection may be operated in the connected state for a while. Thereafter, the RRC connection may enter an inactive state of an idle state (step 900). Thereafter, the terminal device may move to the service area of network node 2. When the RRC connection enter the connected mode again, the terminal device may resume communication with the network node 2 and, as a consequence, the context transfer procedure is triggered (block 902). In the context transfer procedure, the network node 2 may transmit a context request message to network node 1, requesting the context of the terminal device (step 904). Upon receiving the request in step 904, the network node 1 may retrieve the parameters of the context of the terminal device, including the multiple subscriber identifiers, and transmit the information and the multiple subscriber identifiers to the network node 1 (step 906). Upon receiving the multiple subscriber identifiers in the response, the network node 2 may execute block 302 and, additionally, establish the RRC connection in the connected state. Tables below illustrate an embodiment of the context request message transmitted by network node 2 to network node 1 in step 904 and the context response message that may be understood as an embodiment of the handover message (step 906).

```
RetrieveUEContextRequest ::= SEQUENCE {
protocolIEs          ProtocolIE-      {{RetrieveUEContextReque
                     Container        st-IEs}},
...
}
RetrieveUEContextRequest-IEs XNAP-PROTOCOL-IES ::= {
{ID id-newNG-        CRITICALITY   TYPE NG-              PRESENCE
RANnodeUEXnAPI       reject        RANnodeUEXnAPID       mandatory}
D                                                        |
{ID id-UEContextID   CRITICALITY   TYPE UEContextID      PRESENCE
                     reject                              mandatory}
                                                         |
{ID id-MAC-I         CRITICALITY   TYPE MAC-I            PRESENCE
                     reject                              mandatory}
                                                         |
{ID id-new-NG-       CRITICALITY   TYPE NG-RAN-Cell-Identity  PRESENCE
RAN-Cell-Identity    reject                              mandatory}
                                                         |
{ID id-MUSIMInfo                   OCTET STRING PRESENCE
                                   OPTIONAL},
{ID id-              CRITICALITY   TYPE RRCResumeCause   PRESENCE
RRCResumeCause       ignore                              optional },
...
}
```

Above, the information element id-MUSIMInfo may indicate that the network node 2 requests for the information on the multiple subscriber identifiers from the network node 1.

```
RetrieveUEContextResponse ::= SEQUENCE {
protocolIEs         ProtocolI
                    E-              {{RetrieveUEContextReq
                    Containe        uest-IEs}},
                    r
}
RetrieveUEContextResponse-IEs XNAP-PROTOCOL-IES ::= {
{ID id-newNG-       CRITICALITY   TYPE NG-              PRESENCE
RANnodeUEXnAPID     ignore        RANnodeUEXnAPID       mandatory
                                                        }|
{ID id-oldNG-       CRITICALITY   TYPE NG-              PRESENCE
RANnodeUEXnAPID     ignore        RANnodeUEXnAPID       mandatory}
                                                        |
{ID id-GUAMI        CRITICALITY   TYPE GUAMI            PRESENCE
                    reject                              mandatory}
                                                        |
{ID id-             CRITICALITY   TYPE                  PRESENCE
UEContextInfoRetrU  reject        UEContextInfoRetrUECt mandatory}
ECtxtResp                         xtResp                |
```

-continued

```
{ID id-            CRITICALITY  TYPE TraceActivation    PRESENCE
TraceActivation    ignore                               optional }|
{ID id-            CRITICALITY  TYPE MaskedIMEISV       PRESENCE
MaskedIMEISV       ignore                               optional }|
{ID id-            CRITICALITY  TYPE MUSIM-             PRESENCE
MUSIMMaskedIMEIS   ignore       MaskedIMEISVList        optional }|
V
{ID id-            CRITICALITY  TYPE                    PRESENCE
LocationReportingIn ignore      LocationReportingInfor  optional }|
formation                       mation
{ID id-            CRITICALITY  TYPE                    PRESENCE
CriticalityDiagnostic ignore    CriticalityDiagnostics  optional },
...
}
MUSIM-MaskedIMEISVList ::= SEQUENCE {
MaskedIMEISV         BIT STRING (SIZE(64))
}
```

Above, the information element id-MUSIMMaskedIMEISV may deliver the information on the multiple subscriber identifiers of the terminal device to the network node 1. The information may include the multiple subscriber identifiers, at least one of which is not subject to the context transfer (handover), one or more equipment identifiers of the terminal device and, optionally, information linking the subscriber identifiers with the equipment identifier(s).

Figure 6:
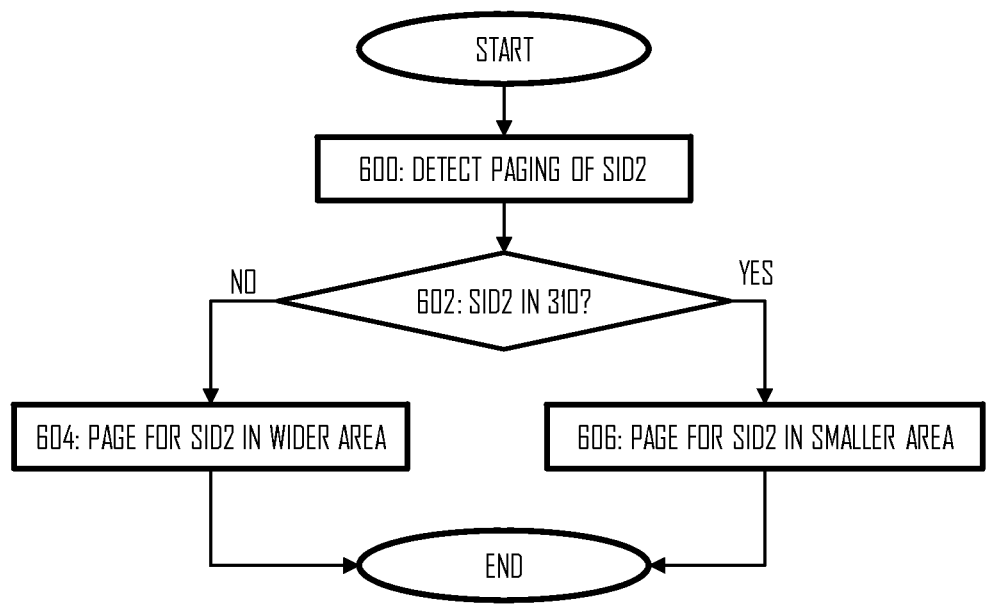
FIGS. 6 and 7 illustrate embodiments of utilizing the shared multiple subscriber identifiers in some procedures of a network node.
Figure 7:
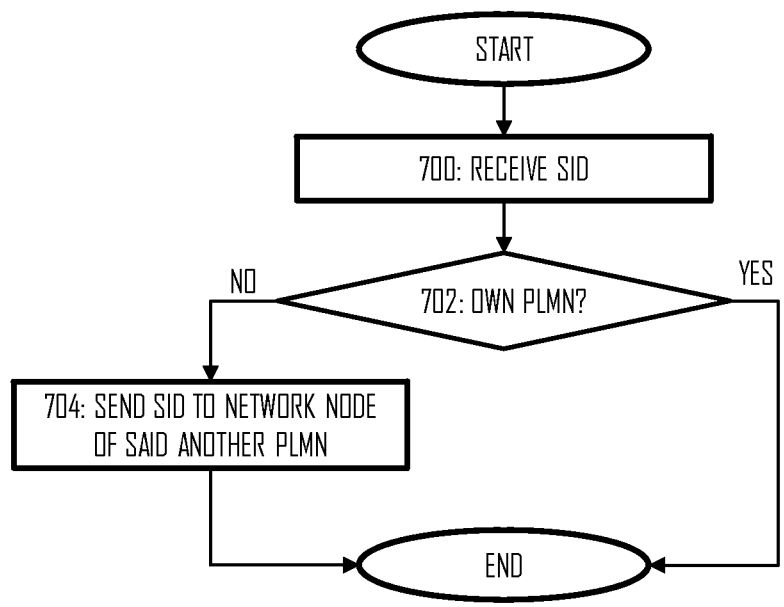

Let us then describe some embodiments of block 304 with reference to FIGS. 6 and 7.

In an embodiment, the procedure using the second subscriber identifier delivered in the handover message is a paging procedure for the second subscriber identifier, and the target network node reduces a paging area by using the second subscriber identifier. Conventionally, a preset paging area is defined for paging a certain subscriber identifier. The preset paging area may be a tracking area comprising a certain number of cells and/or certain number of access nodes that page for the subscriber identifier. Now that the network node has linked the second subscriber identifier with the first subscriber identifier that was handed over to the network node, as described above, the network node may map the location of the second subscriber identifier to a location of the first subscriber identifier by using the mapping and, with the more accurate positioning of the second subscriber identifier, the network node may reduce the paging area smaller than the tracking area. For example, the paging area may be reduced to an area covering the cell to which the first subscriber identifier was handed over and, optionally, to cells neighbouring the target cell. FIG. 6 illustrates such an embodiment.

Referring to FIG. 6, upon receiving a paging message paging for the second subscriber identifier (SID2) in block 600, the network node may first determine whether or not the second subscriber identifier is currently served by the network node. If the second subscriber identifier is served by the network node, the network node may page for the terminal device in a control area of the network node, e.g. in a cell where the second subscriber identifier is determined to be located. However, if the second subscriber identifier is not currently served by the network node, e.g. the second subscriber identifier is currently operating in an RRC idle state, the network node may check in block 602 the database 310 for whether the second subscriber identifier is mapped there to a subscriber identifier that is currently served by the network node (SID1). Upon detecting that the second subscriber identifier is linked to a subscriber identifier served by the network node, the network node may use the location of such a subscriber identifier as a location of the second subscriber identifier and reduce the paging area to that location in block 606. Upon detecting no mapping with another subscriber identifier served by the network node, the network node may page for the second subscriber identifier in the larger, conventional paging area in block 604.

In an embodiment, the mapping between the first subscriber identifier and the second subscriber identifier in the database 310 is used to position the second subscriber identifier for another purpose than paging. The cellular communication systems use positioning for various purposes, and the embodiments enable using the mapping to position, for example, a subscriber identifier that is currently idle.

In an embodiment where the first subscriber identifier and the second subscriber identifier belong to different networks, e.g. to different PLMNs, the procedure of block 304 may comprise transmitting the second identifier to a network node of the other network. As described above, the operators of different PLMNs may have agreed to share information on the locations of the subscribers. Referring to FIG. 7, upon receiving a subscriber identifier in the handover message (block 700 that may be block 300 or step 406 or 506), the (target) network node may determine whether or not the received subscriber identifier belongs to the PLMN of the network node (block 702). If the subscriber identifier belongs to another PLMN, the network node may transmit to a network node of the other PLMN a message comprising the subscriber identifier. In an embodiment, the message also comprises information linking the subscriber identifier to the network node such that the network node of the other PLMN may locate the subscriber identifier to the location of the first subscription that sent the message. In an embodiment, the information linking the subscriber identifier to the network node comprises geolocation coordinates of the network node or the terminal device, e.g. coordinates of a global satellite navigation system (GNSS). If the received subscriber identifier belongs to the PLMN of the network node, the network node may proceed as described above and store the subscriber identifier in the database 310 as linked to the subscriber identifier that was handed over.

Figure 8:
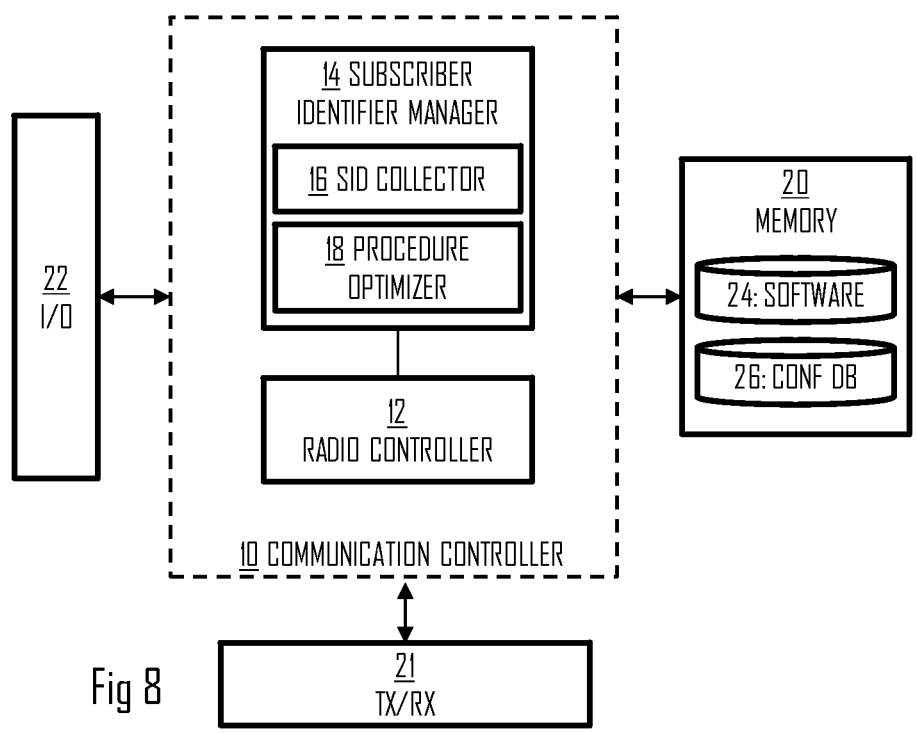
FIG. 8 illustrates a block diagram of a structure of an apparatus according to an embodiment of the invention.

FIG. 8 illustrates an embodiment of a structure of the above-mentioned functionalities of an apparatus executing the functions of the source network node and/or the target network node (network node 1 and/or network node 2 in the embodiments of FIGS. 4 and 5) in the embodiments described above, e.g. the process of FIG. 2 or 3 or any one of embodiments thereof. As described above, the apparatus for the network node may be configured to participate in the sharing of the MUSIM capability information during a handover procedure. In an embodiment, the apparatus may be a circuitry or an electronic device realizing some embodiments of the invention in the network node. The apparatus carrying out the above-described functionalities may thus be comprised in such a device, e.g. the apparatus may comprise a circuitry such as a chip, a chipset, a processor, a micro controller, or a combination of such circuitries for the network node.

Referring to FIG. 8, the apparatus may comprise a communication controller 10 providing the apparatus with capability of performing the above-described functions of the network node. In some embodiments, the apparatus may comprise a radio interface 21 providing the apparatus with radio communication capability, and the communication controller 10 may employ the radio interface 21. The radio interface 21 may enable wireless communications with terminal devices served by the network node. The radio interface 21 may comprise multiple antennas and associated analogue components needed for transmitting and receiving radio signals, e.g. an amplifier, filter, frequency-converter, and an analogue-to-digital converter. The communication controller 10 and/or the radio interface 21 may comprise a radio modem configured to carry out transmission and reception of messages in one or more cells controlled by the network node. In some embodiments, the radio interface 21 is used for communicating with the other network nodes, e.g. wireless X2 or Xn interface.

In some embodiments, the apparatus comprises a second communication interface 22 configured to provide the apparatus with capability of communicating with other network nodes, e.g. with network nodes of the core network 110 and/or with access nodes of the cellular communication system. In some embodiments, the communication interface 22 may also be used to communicate with the network nodes of other PLMNs via wired connections. In the context of 5G networks, the communication interface 22 may be configured to communication over an Xn interface, F1 interface, and/or an NG interface.

The communication controller 10 may comprise at least one processor or a processing circuitry. The apparatus may further comprise a memory 20 storing one or more computer program products 24 configuring the operation of said processor(s) of the apparatus. The memory 20 may be implemented using any suitable data storage technology, such as semiconductor-based memory devices, flash memory, magnetic memory devices and systems, optical memory devices and systems, fixed memory and removable memory. The memory 20 may further store a configuration database 26 storing operational configurations of the apparatus. The configuration database 26 may, for example, store the rules for optimizing the procedures described above in connection with block 304 upon having the MUSIM capability information available. The memory 20 may further store the database 210/310 storing the MUSIM capability information, e.g. the multiple subscriber identifiers mapped to substantially the same terminal device.

The communication controller 10 may comprise, as sub-modules or sub-circuitries, a subscriber identifier manager 14 and a radio controller 12. The radio controller may manage the RRC connections in one or more cells controlled by the network node. The radio controller 12 may also carry out handover procedures for handing over terminal devices between cells and between network nodes. The subscriber identifier manager 14 may cooperate with other network nodes in sharing the information on the multiple subscriber identifiers of individual terminal devices served by the apparatus. For example, the subscriber identifier manager 14 may perform the process of FIG. 2 or any one of its embodiments when handing a terminal device with multiple subscriber identifiers to another network node. The subscriber identifier manager 14 may perform the process of FIG. 3 or any one of its embodiments when receiving a handover of a terminal device with multiple subscriber identifiers from another network node.

The subscriber identifier manager 14 may comprise a subscriber identifier (SID) collector 16 configured to manage the database 310 or 210, depending on the embodiment. For example, upon receiving the handover message comprising the information element indicating multiple subscriber identifiers for a terminal device being handed over, the subscriber identifier manager 14 may extract the multiple subscriber identifiers from the handover message and update the database 310 in the above-described manner. The subscriber identifier manager or the communication controller in general may further comprise a procedure optimizer 18 that selects parameters for a procedure such as paging or positioning of a terminal device on the basis of whether the database 310 stores the multiple subscriber identifiers for a terminal device. The parameters may define, for example, a reduced paging area for a subscriber identifier that is linked to another subscriber identifier in the database 310, as described above.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 7 or any of the embodiments thereof may also be carried out in the form of one or more computer processes defined by one or more computer programs. A separate computer program may be provided in one or more apparatuses that execute functions of the processes described in connection with the Figures. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable not just to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. A source network node comprising a wireless terminal device and including at least one processor, and at least one memory including computer program code, wherein the at least one memory and the computer program code are configured, with the at least one processor, to cause the source network node to:
store at least two subscriber identifiers;
trigger a handover procedure for a first subscriber identifier of the at least two subscriber identifiers; and
transmit, during the handover procedure, a handover message to a target network node, the target network node comprising a base station, an access point, an access node, or a relay station and managing a target cell for the handover procedure, wherein the handover message comprises at least a second subscriber identifier of the at least two subscriber identifiers,
wherein the at least one memory and the computer program code are configured, with the at least one processor, to cause the source network node to:
transmit, to the target network node, a request for indicating the second network node accepts information on multiple subscriber identifiers;
receive, from the target network node as a response to the request, a message indicating the target network node accepts the information on multiple subscriber identifiers; and
wherein the handover message comprising at least the second subscriber identifier is responsive to the target network node indicating that the target network node accepts the information on multiple subscriber identifiers,
wherein the request comprises at least one information element indicating the source network node accepts information on multiple subscriber identifiers,
wherein the at least one memory and the computer program code are configured, with the at least one processor, to cause the source network node to:
upon receiving an instruction from the network to hand a radio resource control connection over to the target network node, when executing the handover, transmit to the target network node a message comprising the second subscriber identifier and further subscriber identifiers of the wireless terminal device;
wherein
multiple subscriber identifiers are stored in a subscriber identifier database stored in a memory of the source network node or in a repository accessible to the source network node,
the database stores a record for the wireless terminal device and a similar record for other wireless terminal devices served by the source network node,
the record stores, in connection with the wireless terminal device, one or more equipment identifiers of the wireless terminal device and the multiple subscriber identifiers of the wireless terminal device,
when the wireless terminal device has multiple equipment identifiers, the record also stores mappings between the subscriber identifiers and the equipment identifiers, the mappings indicating, for one or more or all shared subscriber identifiers an equipment identifier currently used by the respective subscriber identifier for a RRC connection,
the database also stores an identifier of a network node currently serving at least some of the subscriber identifiers,
wherein the at least one memory and the computer program code are configured, with the at least one processor, to cause the source network node to:
provide one of the other wireless terminal devices access to a radio access network of a cellular communication system via a device-to-device link (D2D), wherein the D2D link is handed over to an access node of the radio access network and the wireless terminal device operates as the network node that is the source of the handover.

2. The source network node of claim 1, wherein the second subscriber identifier has no handover or cell reselection procedure pending during transmission of the handover message.

3. The source network node of claim 1, wherein the second subscriber identifier is associated with a radio resource control connection that is in an idle state or inactive state during the handover procedure.

4. The source network node of claim 1, wherein the handover procedure is a procedure for transferring a context of the first subscriber identifier in response to a connection of the first subscriber identifier transitioning from an idle state or an inactive state to a connected state.

5. The source network node of claim 1, wherein the at least one memory and the computer program code are configured, with the at least one processor, to cause the source network node to transmit the at least second subscriber identifier to the target network node in an unsolicited manner.

6. The source network node of claim 1, wherein the handover message further comprises at least one equipment identifier and information mapping the first identifier and the at least second identifier to the at least one equipment identifier.

7. A target network node comprising at least one processor, and at least one memory including computer program code, wherein the target network node comprises a base station, an access point, an access node, or a relay station and the at least one memory and the computer program code are configured, with the at least one processor, to cause the target network node to:
receive, from a source network node comprising a wireless terminal device, a base station, an access point, an access node, or a relay station, a handover message indicating handover of a connection of a first subscriber identifier of a wireless terminal device, the handover being from the source network node to the target network node, wherein the handover message comprises at least a second subscriber identifier;
store the first subscriber identifier and the second identifier; and
perform at least one procedure using the second identifier,
wherein the at least one memory and the computer program code are configured, with the at least one processor, to cause the target network node to:

receive, from the source network node, a request for indicating the target network node accepts information on multiple subscriber identifiers;

transmit, to the source network node as a response to the request, a message indicating the target network node accepts the information on multiple subscriber identifiers; and wherein the handover message comprising at least the second subscriber identifier is responsive to the target network node indicating that the target network node accepts the information on multiple subscriber identifiers, wherein the request comprises at least one information element indicating the source network node accepts information on multiple subscriber identifiers, and wherein the at least one memory and the computer program code are configured, with the at least one processor, to cause the target network node to store information indicated by the at least one information element and use the information in connection with a handover procedure where a radio connection is handed from the source network node over to the target network node, wherein the at least one procedure using the second subscriber identifier comprises a paging procedure for the second subscriber identifier wherein the at least one memory and the computer program code are configured, with the at least one processor, to cause the target network node to:

reduce a paging area by using the second subscriber identifier, upon receiving a paging message paging for the second subscriber identifier, determine that the second subscriber identifier is currently served by the target network node and page for the wireless terminal device in a cell where the second subscriber identifier is determined to be located, upon detecting that the second subscriber identifier is linked to a subscriber identifier served by the target network node, use the location of such a subscriber identifier as a location of the second subscriber identifier and reduce the paging area to that location, upon detecting no mapping with another subscriber identifier served by the network node, page for the second subscriber identifier in the larger, conventional paging area.

8. The target network node of claim 7, wherein the at least second subscriber identifier is transmitted by the source network node as unsolicited by the target network node.

9. The target network node of claim 7, wherein the target network node and the source network node belong to a first network, wherein the second subscriber identifier belongs to a second network, and wherein the at least one procedure using the second subscriber identifier comprises a procedure of transmitting the second subscriber identifier to a network node of the second network.

10. A method for a first source network node comprising a wireless terminal device, a base station, an access point, an access node, or a relay station, the method comprising:

storing at least two subscriber identifiers;

triggering a handover procedure for a first subscriber identifier of the at least two subscriber identifiers; and transmitting, during the handover procedure, a handover message to a target network node, the target network node comprising a base station, an access point, an access node, or a relay station and managing a target cell for the handover procedure, wherein the handover message comprises at least a second subscriber identifier of the at least two subscriber identifiers, wherein the method further comprises:

transmitting, to the target network node, a request for indicating the target network node accepts information on multiple subscriber identifiers;

receiving, from the target network node as a response to the request, a message indicating the target network node accepts the information on multiple subscriber identifiers; and wherein the handover message comprising at least the second subscriber identifier is responsive to the target network node indicating that the target network node accepts the information on multiple subscriber identifiers, wherein the request comprises at least one information element indicating the source network node accepts information on multiple subscriber identifiers, wherein the method further comprises:

upon receiving an instruction from the network to hand a radio resource control connection over to the target network node, when executing the handover, transmitting to the target network node a message comprising the second subscriber identifier and further subscriber identifiers of the wireless terminal device;

wherein multiple subscriber identifiers are stored in a subscriber identifier database stored in a memory of the source network node or in a repository accessible to the source network node, the database stores a record for the wireless terminal device and a similar record for other wireless terminal devices served by the source network node, the record stores, in connection with the wireless terminal device, one or more equipment identifiers of the wireless terminal device and the multiple subscriber identifiers of the wireless terminal device, when the wireless terminal device has multiple equipment identifiers, the record also stores mappings between the subscriber identifiers and the equipment identifiers, the mappings indicating, for one or more or all shared subscriber identifiers an equipment identifier currently used by the respective subscriber identifier for a RRC connection, the database also stores an identifier of a network node currently serving at least some of the subscriber identifiers, wherein the method further comprises:

providing one of the other wireless terminal devices access to a radio access network of a cellular communication system via a device-to-device link (D2D), wherein the D2D link is handed over to an access node of the radio access network and the wireless terminal device operates as the network node that is the source of the handover.

11. A method for a target network node comprising a base station, an access point, an access node, or a relay station, the method comprising:

receiving, from a source network node comprising a wireless terminal device, a base station, an access point, an access node, or a relay station, a handover message indicating handover of a connection of a first subscriber identifier of a wireless terminal device, the handover being from the source network node to the target network node, wherein the handover message comprises at least a second subscriber identifier;

storing the first subscriber identifier and the second identifier; and performing at least one procedure using the second identifier, wherein the method further comprises:

receiving, from the source network node, a request for indicating the target network node accepts information on multiple subscriber identifiers;

transmitting, to the source network node as a response to the request, a message indicating the first target network node accepts the information on multiple subscriber identifiers; and wherein the handover message comprising at least the source subscriber identifier is responsive to the target network node indicating that the target network node accepts the information on multiple subscriber identifiers, wherein the request comprises at least one information element indicating the source network node accepts information on multiple subscriber identifiers, and wherein the method further comprises the target network node storing information indicated by the at least one information element and using the information in connection with a handover procedure where a radio connection is handed from the source network node over to the target network node, wherein the at least one procedure using the second subscriber identifier comprises a paging procedure for the second subscriber identifier wherein the method further comprises:

reducing a paging area by using the second subscriber identifier, upon receiving a paging message paging for the second subscriber identifier, determining the second subscriber identifier is currently served by the target network node and paging for the wireless terminal device in a cell where the second subscriber identifier is determined to be located, upon detecting that the second subscriber identifier is linked to a subscriber identifier served by the target network node, using the location of such a subscriber identifier as a location of the second subscriber identifier and reducing the paging area to that location, upon detecting no mapping with another subscriber identifier served by the network node, paging for the second subscriber identifier in the larger, conventional paging area.

\* \* \* \* \*